United States Patent
Fujiya et al.

(10) Patent No.: US 11,519,727 B2
(45) Date of Patent: Dec. 6, 2022

(54) MEASUREMENT DEVICE, MEASUREMENT METHOD AND PROGRAM

(71) Applicant: PIONEER CORPORATION, Tokyo (JP)

(72) Inventors: Kazufumi Fujiya, Kawagoe (JP); Tomoaki Iwai, Kawagoe (JP); Masahiro Kato, Kawagoe (JP)

(73) Assignee: PIONEER CORPORATION, Tokyo (JP)

(*) Notice: Subject to any disclaimer, the term of this patent is extended or adjusted under 35 U.S.C. 154(b) by 64 days.

(21) Appl. No.: 16/615,091

(22) PCT Filed: May 17, 2018

(86) PCT No.: PCT/JP2018/019134
§ 371 (c)(1),
(2) Date: Nov. 19, 2019

(87) PCT Pub. No.: WO2018/212280
PCT Pub. Date: Nov. 22, 2018

(65) Prior Publication Data
US 2020/0208977 A1 Jul. 2, 2020

(30) Foreign Application Priority Data

May 19, 2017 (JP) ............................ JP2017-100124

(51) Int. Cl.
*G01C 21/00* (2006.01)
*G01C 21/26* (2006.01)
(Continued)

(52) U.S. Cl.
CPC ......... *G01C 21/005* (2013.01); *G01C 21/265* (2013.01); *G01C 21/30* (2013.01); *G01C 21/3605* (2013.01); *G01C 21/3644* (2013.01)

(58) Field of Classification Search
CPC .... G01C 21/005; G01C 21/265; G01C 21/30; G01C 21/3605; G01C 21/3644
See application file for complete search history.

(56) References Cited

U.S. PATENT DOCUMENTS

| | | | | |
|---|---|---|---|---|
| 6,813,370 | B1 * | 11/2004 | Arai | G06K 9/00798 382/104 |
| 2010/0061591 | A1 * | 3/2010 | Okada | G08G 1/166 382/103 |
| 2018/0172455 | A1 | 6/2018 | Yamaguchi et al. | |

FOREIGN PATENT DOCUMENTS

| | | |
|---|---|---|
| EP | 2019288 A1 | 1/2009 |
| JP | 3599421 B2 * | 12/2004 |

(Continued)

OTHER PUBLICATIONS

Machine Translation of JP-3599421-B2 (Year: 2004).*
(Continued)

*Primary Examiner* — Faris S Almatrahi
*Assistant Examiner* — Sahar Motazedi
(74) *Attorney, Agent, or Firm* — Procopio, Cory, Hargreaves & Savitch LLP

(57) ABSTRACT

The above measurement device acquires output data from a sensor unit for detecting surrounding feature, and extracts, from the output data, data corresponding to detection result in a predetermined range in a predetermined positional relation with an own position. The predetermined range is determined in accordance with accuracy of the own position. Then, the measurement device executes predetermined processing based on the extracted data.

6 Claims, 6 Drawing Sheets

(51) Int. Cl.
    *G01C 21/30*     (2006.01)
    *G01C 21/36*     (2006.01)

(56) References Cited

FOREIGN PATENT DOCUMENTS

| JP | 2010023721 A | 2/2010 |
|---|---|---|
| JP | 2015206733 A | 11/2015 |
| JP | 2015222223 A | 12/2015 |
| JP | 2017072422 A | 4/2017 |
| WO | 2016189732 A1 | 12/2016 |

OTHER PUBLICATIONS

Extended European Search Report dated Feb. 3, 2021 in counterpart EP Patent Application No. 18801784.2, 11 pages.
International Search Report for related International Application No. PCT/JP2018/019134, dated Aug. 21, 2018; English translation provided (2 pages).

\* cited by examiner

FIG. 1

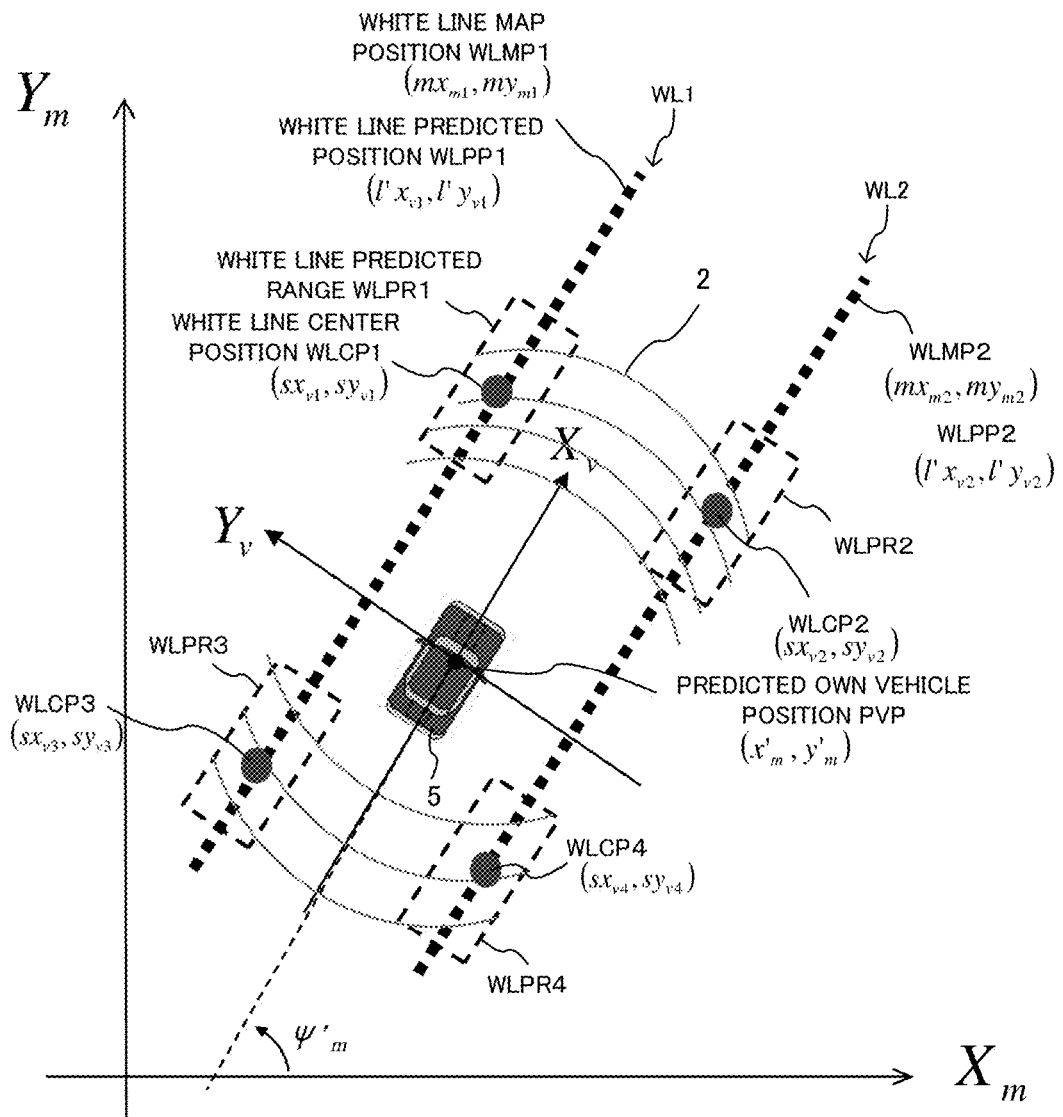

$X_m, Y_m$ : MAP COORDINATE SYSTEM
$X_v, Y_v$ : VEHICLE COORDINATE SYSTEM
WLMP $(mx_m, my_m)$ : WHITE LINE MAP POSITION IN MAP COORDINATE SYSTEM
WLPP $(l'x_v, l'y_v)$ : WHITE LINE PREDICTED POSITION IN VEHICLE COORDINATE SYSTEM
PVP $(x'_m, y'_m)$ : PREDICTED OWN VEHICLE POSITION IN MAP COORDINATE SYSTEM
$\psi'_m$ : PREDICTED OWN VEHICLE AZIMUTH ANGLE IN MAP COORDINATE SYSTEM
WLCP $(sx_v, sy_v)$ : WHITE LINE CENTER POSITION IN VEHICLE COORDINATE SYSTEM ed May 17, 2018,
MEASUREMENT DEVICE, MEASUREMENT METHOD AND PROGRAM

CROSS-REFERENCE TO RELATED APPLICATIONS

This application is a U.S. National Stage entry of PCT Application No: PCT/JP2018/019134 filed May 17, 2018, which claims priority to Japanese Patent Application No. 2017-100124, filed May 19, 2017, the contents of which are incorporated herein by reference.

TECHNICAL FIELD

The present invention relates to a technique of estimating a position of a movable body based on positions of features.

BACKGROUND TECHNIQUE

In an automatic driving vehicle, it is necessary to match feature positions measured by a sensor such as a LiDAR (Light Detection and Ranging) and feature positions in map information for automatic driving to precisely estimate an own vehicle position. Examples of the features used here include white lines, road signs and signboards. Patent Reference 1 discloses an example of a method of estimating an own vehicle position by using the feature positions detected by a LiDAR and the feature positions in map information. Patent Reference 2 discloses a technique of transmitting an electromagnetic wave to a road surface and detecting white lines based on its reflectivity.

PRIOR ART REFERENCES

Patent References

Patent Reference 1: Japanese Patent Application Laid-Open under No. 2017-72422
Patent Reference 2: Japanese Patent Application Laid-Open under No. 2015-222223

SUMMARY OF THE INVENTION

Problem to be Solved by the Invention

When an own vehicle position is estimated using white lines, an amount of data measured by a LiDAR becomes different dependently upon kinds (e.g., continuous line or broken line) of the white lines and deterioration of painting. Therefore, when an own vehicle position is estimated using white lines, detection accuracy of the white lines is changed between the cases in which the amount of LiDAR data used for detecting the while lines is small and large. As a result, accuracy of estimating an own vehicle position is changed.

The above is an example of the problem to be solved by the present invention. It is an object of the present invention to appropriately adjust a range in which white lines are detected according to situation, and to prevent deterioration of accuracy in estimating an own vehicle position.

Means for Solving the Problem

An invention described in claims is a measurement device comprising: an acquisition unit configured to acquire output data from a sensor unit for detecting surrounding feature; an extraction unit configured to extract, from the output data, data corresponding to detection result in a predetermined range in a predetermined positional relation with an own position; and a processing unit configured to execute predetermined processing based on the extracted data, wherein the predetermined range is determined in accordance with accuracy of the own position.

Another invention described in claims is a measurement method executed by a measurement device comprising: an acquisition process configured to acquire output data from a sensor unit for detecting surrounding feature; an extraction process configured to extract, from the output data, data corresponding to detection result in a predetermined range in a predetermined positional relation with an own position; and a processing process configured to execute predetermined processing based on the extracted data, wherein the predetermined range is determined in accordance with accuracy of the own position.

Still another invention described in claims is a program executed by a measurement device including a computer, the program causes the computer to function as: an acquisition unit configured to acquire output data from a sensor unit for detecting surrounding feature; an extraction unit configured to extract, from the output data, data corresponding to detection result in a predetermined range in a predetermined positional relation with an own position; and a processing unit configured to execute predetermined processing based on the extracted data, wherein the predetermined range is determined in accordance with accuracy of the own position.

BRIEF DESCRIPTION OF THE DRAWINGS

FIG. 1 is a diagram explaining a white line extraction method.

DETAILED DESCRIPTION OF THE PREFERRED EMBODIMENTS

Figure 2A:
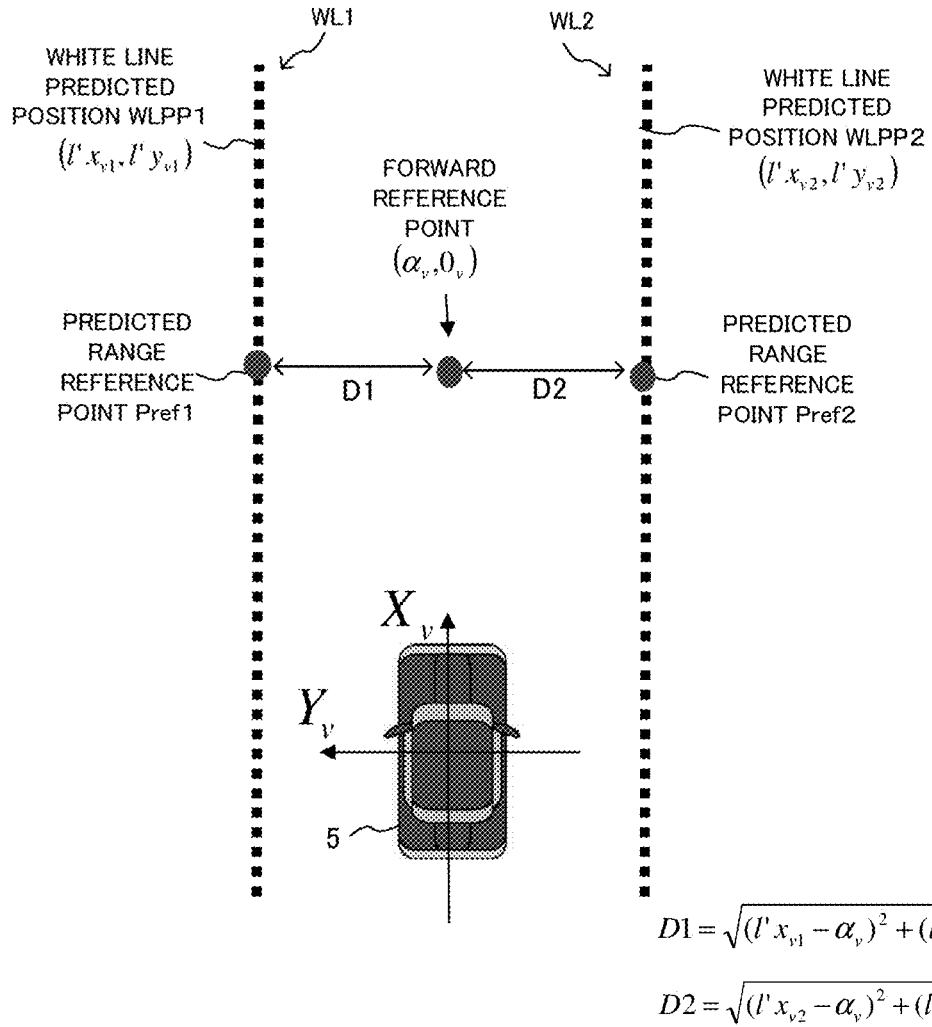
FIGS. 2A and 2B are diagrams explaining a determination method of white line predicted range.

According to one aspect of the present invention, there is provided a measurement device comprising: an acquisition unit configured to acquire output data from a sensor unit for detecting surrounding feature; an extraction unit configured to extract, from the output data, data corresponding to detection result in a predetermined range in a predetermined positional relation with an own position; and a processing unit configured to execute predetermined processing based on the extracted data, wherein the predetermined range is determined in accordance with accuracy of the own position.

The above measurement device acquires output data from a sensor unit for detecting surrounding feature, and extracts, from the output data, data corresponding to detection result in a predetermined range in a predetermined positional relation with an own position. Then, the measurement device executes predetermined processing based on the extracted data. The predetermined range is determined in accordance with accuracy of the own position. Therefore, the predetermined range is appropriately determined in accordance with the accuracy of the own position, and the predetermined processing is executed based on the data extracted from the predetermined range.

In one mode of the above measurement device, the feature is a road surface line painted on a road surface, and the predetermined range is determined in accordance with the accuracy of the own position in a first direction crossing a longitudinal direction of the road surface line. In this mode, the predetermined range is determined in accordance with the accuracy of the own position in the first direction crossing the longitudinal direction of the road surface line. In this specification, "the road surface line" includes lane dividing lines such as white lines and yellow lines, and linear road signs such as stop-lines and pedestrian crossing.

In a preferred example of the above measurement device, the extraction unit changes a length of the predetermined range in the first direction in accordance with the accuracy of the own position in the first direction. In another preferred example, the extraction unit changes the length of the predetermined range in the first direction in accordance with the length of the road surface line in the first direction and the accuracy of the own position. In still another preferred example, the extraction unit makes the length in the first direction longer as the accuracy of the own position becomes lower.

In another mode of the above measurement device, the measurement device is loaded on a movable body, and the extraction unit sets the predetermined range at four positions including a right-front position, a right-rear position, a left-front position and a left-rear position with respect to a position of the movable body. In this mode, the data is extracted in the four positions around the movable body, and the predetermined processing is executed based on them. Preferably, the processing unit executes processing of detecting a position of the feature and estimating a position of the measurement device based on the position of the feature.

According to another aspect of the present invention, there is provided a measurement method executed by a measurement device comprising: an acquisition process configured to acquire output data from a sensor unit for detecting surrounding feature; an extraction process configured to extract, from the output data, data corresponding to detection result in a predetermined range in a predetermined positional relation with an own position; and processing process configured to execute predetermined processing based on the extracted data, wherein the predetermined range is determined in accordance with accuracy of the own position. According to this method, the predetermined range is appropriately determined in accordance with the accuracy of the own position, and the predetermined processing is executed based on the data extracted from the predetermined range.

According to still another aspect of the present invention, there is provided a program executed by a measurement device including a computer, the program causes the computer to function as: an acquisition unit configured to acquire output data from a sensor unit for detecting surrounding feature; an extraction unit configured to extract, from the output data, data corresponding to detection result in a predetermined range in a predetermined positional relation with an own position; and a processing unit configured to execute predetermined processing based on the extracted data, wherein the predetermined range is determined in accordance with accuracy of the own position. By executing the program by a computer, the above measurement device may be realized. This program may be handled in a manner stored in a storage medium.

EMBODIMENTS

A preferred embodiment of the present invention will be described below with reference to the attached drawings.
[White Line Extraction Method]
FIG. 1 is a diagram explaining a white line extraction method. "White line extraction" is to detect a white line painted on a road surface and calculate its predetermined position, e.g., a center position.
(Calculation of White Line Predicted Position)
As illustrated, a vehicle 5 exists on a map coordinate system $(X_m, Y_m)$, and a vehicle coordinate system $(X_v, Y_v)$ is defined based on the position of the vehicle 5. Specifically, the traveling direction of the vehicle 5 is defined as $X_v$-axis of the vehicle coordinate system, and its perpendicular direction is defined as $Y_v$-axis of the vehicle coordinate system.

On the left and right sides of the vehicle 5, there are white lines serving as lane boundaries. The positions of the white lines on the map coordinate system, i.e., the white line map positions are included in high-density map managed by a server, and are acquired from the server. In this embodiment, the data of the white line is stored in the high-density map as coordinate point sequence. The LiDAR loaded on the vehicle 5 measures scan data along the scan lines 2. The scan lines 2 indicate loci of the scan by the LiDAR.

In FIG. 1, it is supposed that the coordinates of the points forming the white line WL1 on the left side of the vehicle 5, i.e., the white line map positions WLMP1 are $(mx_{m1}, my_{m1})$, and that the coordinates of the points forming the white line WL2 on the right side of the vehicle 5, i.e., the white line map positions WLMP2 are $(mx_{m2}, my_{m2})$. The predicted own vehicle position PVP on the map coordinate system is given as $(x'_m, y'_m)$, and the predicted own vehicle azimuth angle is given as $\Psi'_m$.

Here, the white line predicted positions WLPP($l'x_v$, $l'y_v$) indicating predicted positions of the white lines are given by the following equation (1) using the white line map position WLMP($mx_m$, $my_m$), the predicted own vehicle position PVP $(x'_m, y'_m)$ and the predicted own vehicle azimuth angle $\Psi'_m$.

$$\begin{bmatrix} l'x_v \\ l'y_v \end{bmatrix} = \begin{bmatrix} \cos\Psi'_m & \sin\Psi'_m \\ -\sin\Psi'_m & \cos\Psi'_m \end{bmatrix} \begin{bmatrix} mx_m - x'_m \\ my_m - y'_m \end{bmatrix} \quad (1)$$

Therefore, by the equation (1), the white line predicted positions WLPP1($l'x_{v1}$, $l'y_{v1}$) are calculated for the white line WL1, and the white line predicted positions WLPP2 ($l'x_{v2}$, $l'y_{v2}$) are calculated for the white line WL2. Thus, for each of the white lines WL1 and WL2, plural white line predicted positions WLPP1 and WLPP2 are obtained.

(Determination of White Line Predicted Range)
Next, based on the white line predicted positions WLPP, white line predicted ranges WLPR are determined. The white line predicted range WLPR indicates a range in which the white line is supposed to exist, based on the predicted own vehicle position PVP. The white line predicted ranges WLPR are set at four positions at most, i.e., at the right-front position, the right-rear position, the left-front position and the left-rear position of the vehicle 5.

Figure 2B:
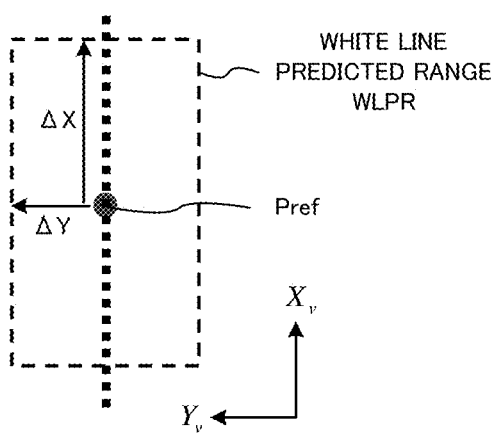

FIGS. 2A and 2B illustrate a determination method of the white line predicted range WLPR. In FIG. 2A, a forward reference point $(\alpha_v, 0_v)$ is set at an arbitrary position (at the position of the distance $\alpha_v$) ahead of the vehicle 5. Then, based on the forward reference point $(\alpha_v, 0_v)$ and the white line predicted positions WLPP, the white line predicted position WLPP nearest from the forward reference point ($\alpha_v$, $0_v$) is searched. Specifically, as to the white line WL1, a distance D1 is calculated by the following equation (2) based on the forward reference point ($\alpha_v$, $0_v$) and plural white line predicted posit ions WLPP1($l'x_{v1}$, $l'y_{v1}$) forming the white line WL1, and the white line predicted position WLPP1 having the minimum distance D1 is determined as a predicted range reference point Pref1.

$$D1 = \sqrt{(l'x_{v1} - \alpha_v)^2 + (l'y_{v1})^2} \quad (2)$$

Similarly, as to the white line WL2, a distance D2 is calculated by the following equation (3) based on the forward reference point ($\alpha_v$, $0_v$) and plural white line predicted positions WLPP2($l'x_{v2}$, $l'y_{v2}$) forming the white line WL2, and the white line predicted position WLPP2 having the minimum distance D2 is determined as a predicted range reference point Pref2.

$$D2 = \sqrt{(l'x_{v2} - \alpha_v)^2 + (l'y_{v2})^2} \quad (3)$$

Then, as illustrated in FIG. 2B, an arbitrary range based on the predicted range reference point Pref, i.e., a range of $\pm \Delta X$ in the $X_v$-axis direction and $\pm \Delta Y$ in the $Y_v$-axis direction from the predicted range reference point Pref is set as the white line predicted range WLPR. Thus, as illustrated in FIG. 1, the white line predicted ranges WLPR1 and WLPR2 are set at the left and right positions ahead of the vehicle 5. Similarly, by setting a rear reference point behind the vehicle 5 to set the predicted range reference points Pref, the white line predicted ranges WLPR3 and WLPR4 are set at the left and right positions behind the vehicle 5. Thus, four white line predicted ranges WLPR1 to WLPR4 are set.

[Calculation of White Line Center Position]

Figure 3B:
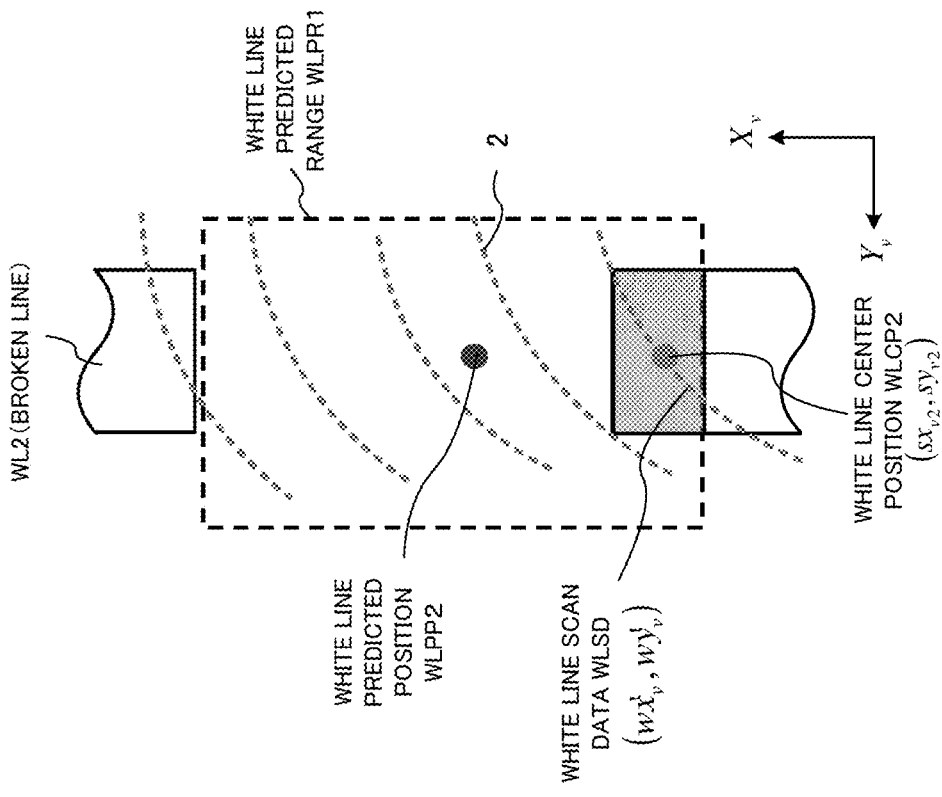
FIGS. 3A and 3B are diagrams explaining a calculation method of white line center position.
Figure 3A:
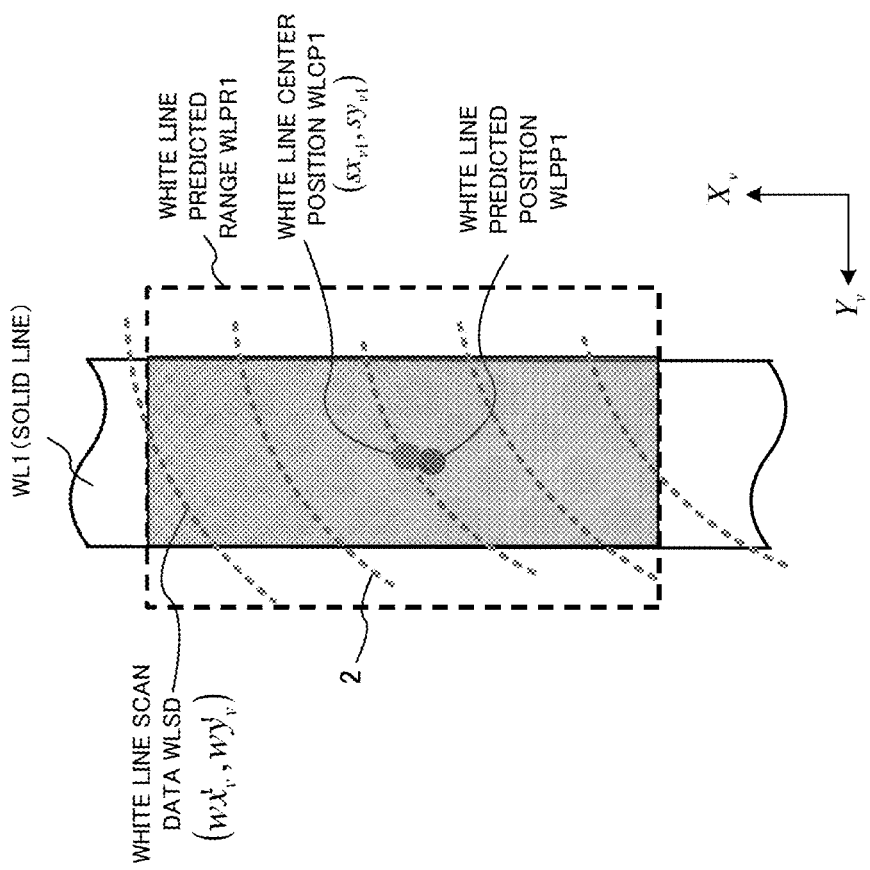

Next, a white line center position WLCP is calculated using the white line predicted positions WLPP. FIGS. 3A and 3B illustrate a calculation method of the white line center position WLCP. FIG. 3A illustrates the case where the white line WL1 is a solid line. The white line center position WLCP1 is calculated by an average value of the position coordinates of the scan data forming the white line. When the white line predicted range WLPR1 is set as shown in FIG. 3A, white line scan data WLSD1($wx'_v$, $wy'_v$) existing in the white line predicted range WLPR1 are extracted from the scan data outputted by the LiDAR. Since the reflectivity is higher on the white line than on a normal road, the scan data acquired on the white line have high reflectivity. Out of the scan data outputted by the LiDAR, the scan data existing in the white line predicted range WLPR1, existing on the road and having a reflection intensity higher than a predetermined value are extracted as the white line scan data WLSD. Supposing that the number of the extracted white line scan data WLSD is "n", the coordinates of the white line center position WLCP1($sx_{v1}$, $sy_{v1}$) is calculated by the following equation (4).

$$sx_v = \frac{1}{n}\sum_{k=1}^{n} wx_{vn}$$
$$sy_v = \frac{1}{n}\sum_{k=1}^{n} wy_{vn} \quad (4)$$

n: number of white line scan data

Also, as shown in FIG. 3B, the white line center position WLCP2 is calculated in the same manner when the white line is a broken line.

(Correction of White Line Predicted Range)

Next, correction of the white line predicted range will be described. As described above, the white line predicted range WLPR is determined based on the white line predicted positions WLPP. However, when the estimation accuracy of the white line predicted positions WLPP is low, the accuracy of the white line predicted range WLPR becomes low, and the white line may possibly deviate from the white line predicted range WLPR.

Figure 4A:
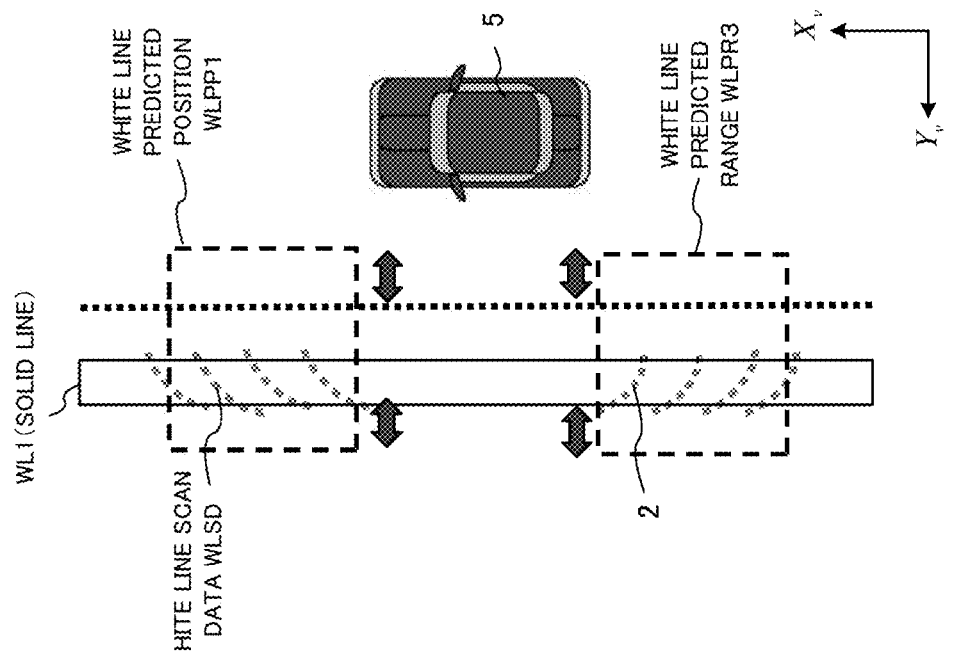
FIGS. 4A and 4B are diagrams explaining a correction method of the white line predicted range.

FIG. 4A illustrates a case where the estimation accuracy of the white line predicted positions WLPP are low. Specifically, it is supposed that the accuracy of the predicted own vehicle position PVP of the vehicle 5 is 1 m in the lateral direction of the vehicle 5, i.e., $Y_v$-axis direction. In this case, the predicted own vehicle position PVP of the vehicle 5 has an error of ±1 m in the $Y_v$-axis direction. Therefore, if the white line predicted positions WLPP are calculated using this predicted own vehicle position PVP and the white line predicted range WLPR is set, the white line predicted range WLPR may possibly deviate from the actual position of the white line WL1 as shown in FIG. 4A. In such a case, since the number of the white line scan data acquired in the white line predicted range WLPR becomes small, the accuracy of extracting the white line is deteriorated, and consequently the accuracy of the own vehicle position estimation is deteriorated.

Figure 4B:
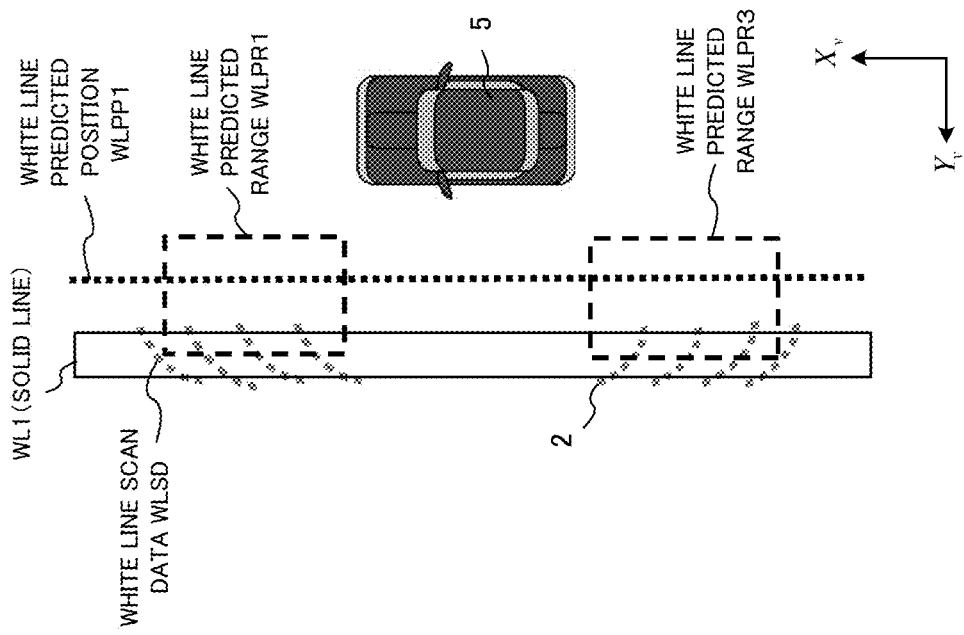

In order to solve this problem, in this embodiment, the width of the white line predicted range WLPR is corrected based on the estimation accuracy of the predicted own vehicle position PVP of the vehicle 5 as shown in FIG. 4B. Namely, the width of the white line predicted range WLPR is changed by a value according to the accuracy of the predicted own vehicle position PVP. As a basic correction method, the length (width) of the white line predicted range WLPR in the $Y_v$-axis direction is made larger as the estimation accuracy of the predicted own vehicle position PVP in the $Y_v$-axis direction becomes lower.

For example, when the estimation accuracy of the predicted own vehicle position PVP in the $Y_v$-axis direction is 1 m, the correction is made to increase the width of the white line predicted range WLPR, set by the method described with reference to FIG. 2, by 1 m leftward and rightward in the $Y_v$-axis direction. Thus, the white line predicted range WLPR after the correction has the width considering the prediction error of the predicted own vehicle position PVP, and the possibility that the white line WL deviates from the white line predicted range WLPR can be reduced. The above is merely an example, the width in the $Y_v$-axis direction may be increased by the value obtained by multiplying a certain coefficient by the estimation accuracy of the predicted own vehicle position PVP, for example.

As a specific example, when the own vehicle position is estimated using extended Kalman filter, the accuracy of the current predicted own vehicle position PVP may be calculated from the values of the covariance matrix sequentially calculated by the expanded Kalman filter and the white line predicted range WLPR may be corrected. The predicted range for a general feature (landmark) is given by the following equation.

$$S(t) = \begin{bmatrix} S_x(t) \\ S_y(t) \\ S_z(t) \end{bmatrix} = \begin{bmatrix} D_M \\ W_M \\ H_M \end{bmatrix} + c \begin{bmatrix} \sqrt{P_{11}(t)} \\ \sqrt{P_{22}(t)} \\ C_z \end{bmatrix} \quad (5)$$

Here, "$D_M$", "$W_M$", "$H_M$" are sizes of the feature stored in the high-density map. "$\sqrt{P_{11}(t)}$" and "$\sqrt{P_{22}(t)}$" are square roots of the elements of the covariance matrix and indicate the estimation accuracy in the x-direction and the y-direction, respectively. "$C_z$" is a constant indicating the z-direction (vertical direction) component, and "c" is a coefficient. According to this equation, the prediction range becomes small when the estimation accuracy of the predicted own vehicle position PVP is high, and the predicted range becomes large when the estimation accuracy of the predicted own vehicle position PVP is low. Since the white line is used as the feature in this embodiment, the width (correction amount) of the white line predicted range WLPR may be determined based on the $Y_v$-axis direction component of the size S(t) of the predicted range calculated by the equation (5).

[Device Configuration]

Figure 5:
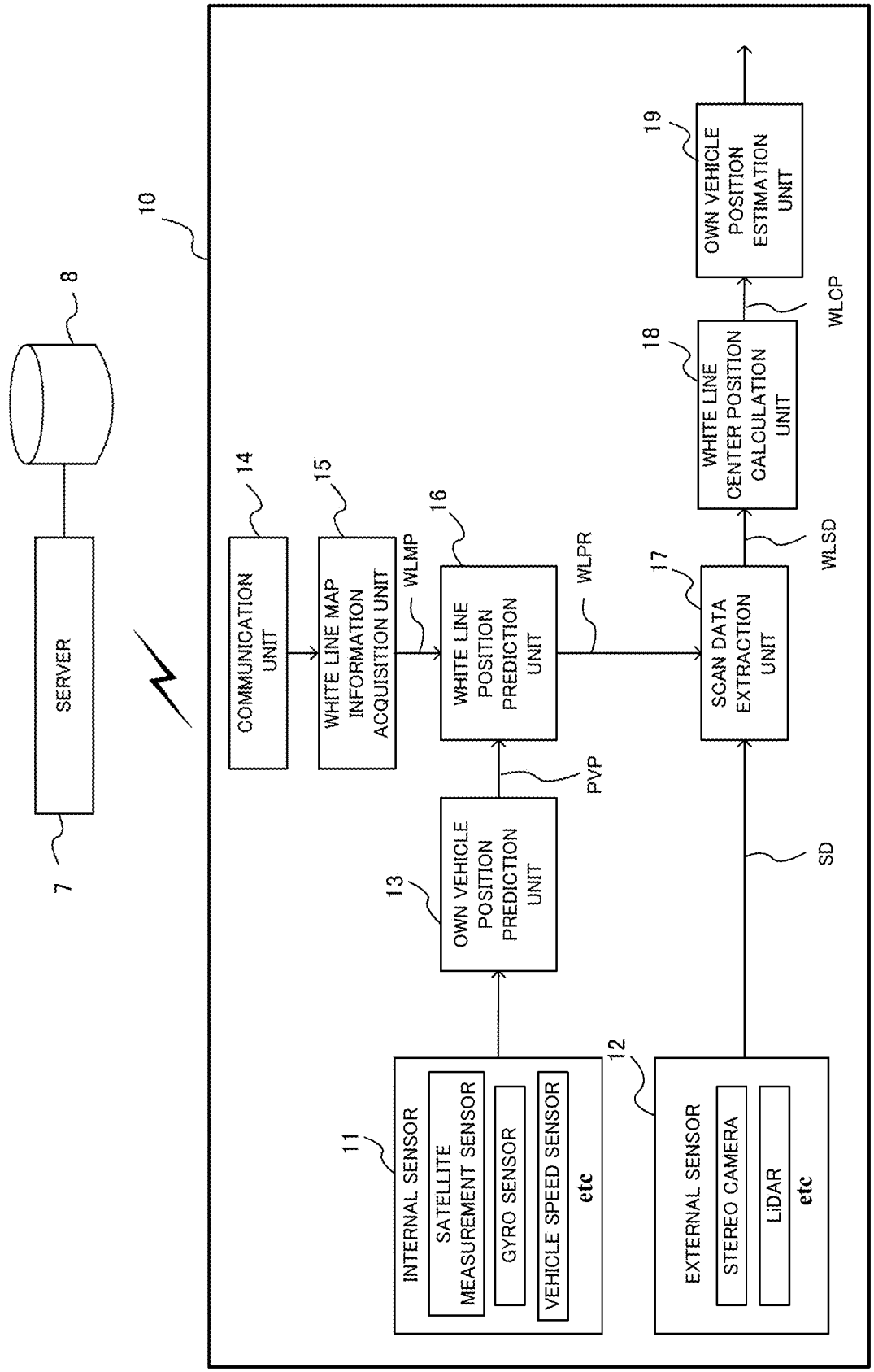
FIG. 5 is a block diagram illustrating a configuration of a measurement device.

FIG. 5 illustrates a schematic configuration of an own vehicle position estimation device to which a measurement device according to the present invention is applied. The own vehicle position estimation device 10 is loaded on a vehicle, and communicable with a server 7 such as a cloud server by wireless communication. The server 7 is connected to a database 8, and the database 8 stores high-density map. The high-density map stored in the database 8 includes landmark map information for each landmark. As to the white lines, the database 8 stores white line map positions WLMP indicating the coordinates of the point sequence forming the white lines. The own vehicle position estimation device 10 communicates with the server 7, and downloads the white line map information related to the white lines around the position of the vehicle.

The own vehicle position estimation device 10 includes internal sensors 11, external sensors 12, an own vehicle position prediction unit 13, a communication unit 14, a white line map information acquisition unit 15, a white line position prediction unit 16, a scan data extraction unit 17, a white line center position calculation unit 18 and an own vehicle position estimation unit 19. The own vehicle position prediction unit 13, the white line map information acquisition unit 15, the white line position prediction unit 16, the scan data extraction unit 17, the white line center posit ion calculation unit 18 and the own vehicle position estimation unit 19 are realized by a computer such as a CPU which executes a program prepared in advance.

The internal sensors 11 measure the own vehicle position of the vehicle as a GNSS (Global Navigation Satellite System)/IMU (Inertia Measurement Unit) composite navigation system, and include a satellite measurement sensor (GPS), a gyro sensor and a vehicle speed sensor. The own vehicle position prediction unit 13 predicts the own vehicle position by the GNSS/IMU composite navigation system based on the outputs of the internal sensors 11, and supplies the predicted own vehicle position PVP to the white line position prediction unit 16.

The external sensors 12 are the sensors for detecting objects around the vehicle, and include a stereo camera and a LiDAR. The external sensors 12 supply the scan data SD acquired by the measurement to the scan data extraction unit 17.

The communication unit 14 is used for wireless communication with the server 7. The white line map information acquisition unit 15 receives the white line map information associated with the white lines existing around the vehicle from the server 7 via the communication unit 14, and supplies the white line map positions WLMP included in the white line map information to the white line position prediction unit 16.

The white line position prediction unit 16 calculates the white line prediction positions WLPP by the aforementioned equation (1) based on the white line map positions WLMP and the predicted own vehicle position PVP acquired from the own vehicle position prediction unit 13. Also, the white line position prediction unit 16 determines the white line prediction ranges WLPR by the aforementioned equations (2) and (3) based on the white line prediction positions WLPP, and corrects the white line prediction ranges WLPR in accordance with the estimation accuracy of the predicted own vehicle position PVP as described above. Then, the white line position prediction unit 16 supplies the corrected white line prediction ranges WLPR to the scan data extraction unit 17.

The scan data extraction unit 17 extracts the white line scan data WLSD based on the white line prediction ranges WLPR supplied from the white line position prediction unit 16 and the scan data SD acquired from the external sensors 12. Specifically, from the scan data SD, the scan data extraction unit 17 extracts the scan data which are included in the white line prediction ranges WLPR, which are on the road, and whose reflection intensity is larger than a predetermined value, as the white line scan data WLSD, and supplies them to the white line center position calculation unit 18.

The white line center position calculation unit 18 calculates the white line center positions WLCP from the white line scan data WLSD by the equation (4), as described with reference to FIGS. 3A and 3B. Then, the white line center position calculation unit 18 supplies the calculated white line center positions WLCP to the own vehicle position estimation unit 19.

The own vehicle position estimation unit 19 estimates the own vehicle position and the own vehicle azimuth angle based on the white line map positions WLMP in the high-density map and the white line center positions WLCP which are the measurement data of the white lines by the external sensor 12. Japanese patent application laid-open under No 2017-72422 discloses an example of a method for estimating an own vehicle position by matching the landmark position information in the high-density map and the measured position information of the landmark by external sensors.

In the above configuration, the external sensor 12 is an example of a sensor unit according to the present invention, the scan data extraction unit 17 is an example of an acquisition unit and an extraction unit of the present invention, and the own vehicle position estimation unit 19 is an example of a processing unit of the present invention.

[Own Vehicle Position Estimation Processing]

Figure 6:
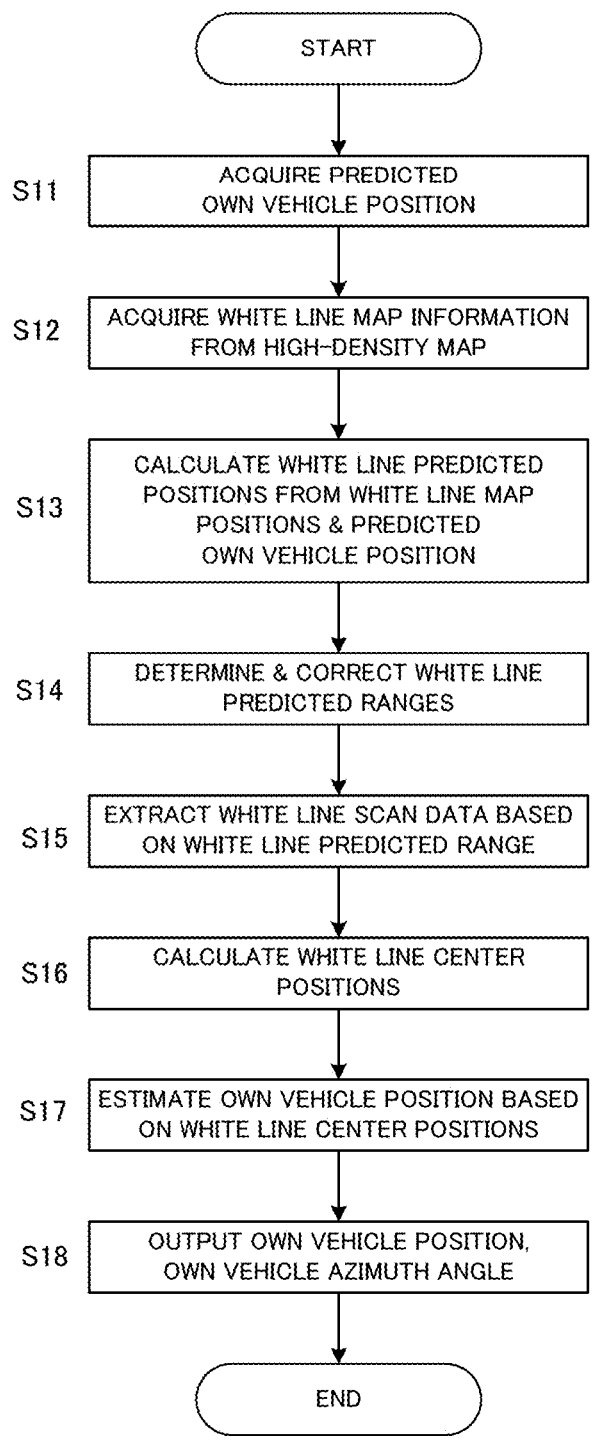
FIG. 6 is a flowchart of an own vehicle position estimation processing using white lines.

Next, the own vehicle position estimation processing by the own vehicle position estimation device 10 will be described. FIG. 6 is a flowchart of the own vehicle position estimation processing. This processing is realized by a computer such as a CPU which executes a program prepared in advance to function as the components shown in FIG. 5.

First, the own vehicle position predict ion unit 13 acquires the predicted own vehicle position PVP based on the outputs from the internal sensors 11 (step S11). Next, the white line map information acquisition unit 15 connects to the server 7 via the communication unit 14, and acquires the white line map information from the high-density map stored in the database 8 (step S12). It is noted that step S11 and S12 may be exchanged.

Next, the white line position prediction unit 16 calculates the white line prediction positions WLPP based on the white line map positions WLMP included in the white line position information acquired in step S12 and the predicted own vehicle position PVP acquired in step S11 (step S13). Also, the white line position prediction unit 16 determines the white line predicted ranges WLPR based on the white line predicted positions WLPP, and further corrects the white line predicted ranges WLPR based on the estimation accuracy of the predicted own vehicle position PVP to supply the corrected white line prediction ranges WLPR to the scan data extraction unit 17 (step S14).

Next, from the scan data SD acquired from the LiDAR serving as the external sensor 12, the scan data extraction unit 17 extracts the scan data which are included in the white line prediction ranges WLPR, which are on the road, and whose reflection intensity is larger than the predetermined value, as the white line scan data WLSD, and supplies them to the white line center position calculation unit 18 (step S15).

Next, the white line center position calculation unit 18 calculates the white line center positions WLCP based on the white line prediction ranges WLPR and the white line scan data WLSD, and supplies them to the own vehicle position estimation unit 19 (step S16). Then, the own vehicle position estimation unit 19 executes own vehicle position estimation using the white line center positions WLCP (step S17), and outputs the own vehicle position and the own vehicle azimuth angle (step S18). Then, the own vehicle position estimation processing ends.

Modified Example

While the above embodiment uses the white lines which are the lane boundaries indicating the lanes, the application of the present invention is not limited to this example, and linear road signs such as pedestrian crossings and stop lines may be used. Also, instead of white lines, yellow lines may be used. The lane dividing lines such as white and yellow lines and the road signs mentioned above are examples of road surface lines according to the present invention.

BRIEF DESCRIPTION OF REFERENCE NUMBERS

5 Vehicle
7 Server
8 Database
10 Own vehicle position estimation device
11 Internal sensor
12 External sensor
13 Own vehicle position prediction unit
14 Communication unit
15 White line map information acquisition unit
16 White line position prediction unit
17 Scan data extraction unit
18 White line center position calculation unit
19 Own vehicle position estimation unit

The invention claimed is:

1. A measurement device comprising:
a memory configured to store a program; and
a central processing unit (CPU) coupled to the memory and configured to execute the program to:
predict an own position of the measurement device based on first output data from a first sensor;
determine a predetermined range of a road surface line on a road surface at a predetermined positional relation to the predicted own position of the measurement device;
change the predetermined range in a first direction in accordance with an accuracy of the predicted own position in the first direction, the first direction crossing a longitudinal direction of the road surface line;
acquire second output data from a second sensor for detecting then road surface line;
extract, from the second output data, data corresponding to then changed predetermined range;
from the extracted data corresponding to the changed predetermined range, detect a position of the road surface line; and
estimate a position of the measurement device based on the detected position of the road surface line,
wherein the measurement device is loaded on a movable body traveling on the road surface,
wherein the position of the measurement device is used as a position of the movable body to perform a driving assistance of the movable body using the position of the movable body, and
wherein the measurement device improves accuracy in estimating the position of the measurement device based on the position of the road surface line detected based on the data corresponding to the changed predetermined range.

2. The measurement device according to claim 1, wherein, in the changing of the predetermined range, a length of the predetermined range is changed in the first direction in accordance with a length of the road surface line in the first direction and the accuracy of the predicted own position in the first direction.

3. The measurement device according to claim 1, wherein, in the changing of the predetermined range, a length of the predetermined range in the first direction is made longer as the accuracy of the predicted own position in the first direction becomes lower.

4. The measurement device according to claim 1,
wherein the CPU is further configured to execute the program to set the predetermined range at four positions including a right-front position, a right-rear position, a left-front position and a left-rear position with respect to the predicted own position.

5. A measurement method executed by a measurement device, the method comprising:
predicting an own position of the measurement device based on first output data from a first sensor;
determining a predetermined range of a road surface line on a road surface at a predetermined positional relation to the predicted own position of the measurement device;
changing the predetermined range in a first direction in accordance with an accuracy of the predicted own position in the first direction, the first direction crossing a longitudinal direction of the road surface line;
acquiring second output data from a second sensor for detecting the road surface line;
extracting, from the second output data, data corresponding to the changed predetermined range;
from the extracted data corresponding to the changed predetermined range, detecting a position of the road surface line; and
estimating a position of the measurement device based on the detected position of the road surface line,
wherein the measurement device is loaded on a movable body traveling on the road surface, wherein the position of the measurement device is used as a position of the movable body to perform a driving assistance of the movable body using the position of the movable body, and wherein the measurement device improves accuracy in estimating the position of the measurement device based on the position of the road surface line detected based on the data corresponding to the changed predetermined range.

6. A non-transitory computer-readable storage medium storing a program that, when executed by a measurement device including a computer, causes the computer to:

predict an own position of the measurement device based on first output data from a first sensor;

determine a predetermined range of a road surface line on a road surface at a predetermined positional relation to the predicted own position of the measurement device;

change the predetermined range in a first direction in accordance with an accuracy of the predicted own position in the first direction, the first direction crossing a longitudinal direction of the road surface line;

acquire second output data from a second sensor for detecting the road surface line;

extract, from the second output data, data corresponding to the changed predetermined range;

from the extracted data corresponding to the changed predetermined range, detect a position of the road surface line; and estimate a position of the measurement device based on the detected position of the road surface line, wherein the measurement device is loaded on a movable body traveling on the road surface, wherein the position of the measurement device is used as a position of the movable body to perform a driving assistance of the movable body using the position of the movable body, and wherein the measurement device improves accuracy in estimating the position of the measurement device based on the position of the road surface line detected based on the data corresponding to the changed predetermined range.

* * * * *